United States Patent
Peretti

(10) Patent No.: US 8,341,596 B2
(45) Date of Patent: Dec. 25, 2012

(54) METHOD AND SYSTEM FOR CONTROLLING THE RE-EXECUTION OF A RULE BRANCH

(75) Inventor: Massimo Peretti, Genoa (IT)

(73) Assignee: Siemens Aktiengesellschaft, Munich (DE)

(*) Notice: Subject to any disclaimer, the term of this patent is extended or adjusted under 35 U.S.C. 154(b) by 1037 days.

(21) Appl. No.: 12/340,800

(22) Filed: Dec. 22, 2008

(65) Prior Publication Data

US 2009/0164879 A1  Jun. 25, 2009

(30) Foreign Application Priority Data

Dec. 20, 2007  (EP) .................................. 07024733

(51) Int. Cl.
*G06F 9/44* (2006.01)
(52) U.S. Cl. ........ 717/109; 717/104; 717/136; 717/149; 700/21
(58) Field of Classification Search .......... 717/104–109, 717/120–129, 136–149; 700/21–26, 102, 700/192; 707/651, 784; 712/234–241
See application file for complete search history.

(56) References Cited

U.S. PATENT DOCUMENTS

| | | | | |
|---|---|---|---|---|
| 6,006,193 A | * | 12/1999 | Gibson et al. | 705/7.26 |
| 6,851,043 B1 | * | 2/2005 | Inoue | 712/217 |
| 7,343,605 B2 | * | 3/2008 | Langkafel et al. | 719/316 |
| 7,440,811 B2 | * | 10/2008 | Giebels et al. | 700/100 |
| 7,822,492 B2 | * | 10/2010 | De Benedetto et al. | 700/29 |
| 2003/0236577 A1 | * | 12/2003 | Clinton | 700/10 |
| 2005/0010931 A1 | * | 1/2005 | Langkafel et al. | 719/328 |
| 2005/0039161 A1 | | 2/2005 | Pfander et al. | |
| 2005/0149218 A1 | * | 7/2005 | Lube et al. | 700/100 |
| 2005/0210455 A1 | * | 9/2005 | Koehler et al. | 717/136 |
| 2006/0168570 A1 | * | 7/2006 | Wang et al. | 717/127 |

OTHER PUBLICATIONS

Chaar et al., A Specification Language for Planning and Fault Recovery in Manufacturing Systems, The International Journal of Flexible Manufacturing Systems, 5 (1993), © 1993 Kluwer Academic Publishers, Boston. Manufactured in The Netherlands, pp. 209-253.*
Stoyenko et al., Extending Pearl for Industrial Real-Time Applications; IEEE, 19993, pp. 65-74.*

(Continued)

*Primary Examiner* — Wei Zhen
*Assistant Examiner* — Satish Rampuria
(74) *Attorney, Agent, or Firm* — Laurence A. Greenberg; Werner H. Stemer; Ralph E. Locher

(57) ABSTRACT

A method control for the re-execution of a rule branch in a rule represented by a graphic flowchart in a MES system. At developing time there is defined a recycle step which includes a conditional expression to be customized. Each time it is executed in run time, the status of the recycle step is set by the execution engine as "active" until the set of steps of the rule branch that follows is executed and then the recycle step status is set as "non-active." At run time, the execution engine keeps waiting any request of executing a certain recycle step that is in "active" status and when the execution engine executes a certain recycle step, it sets the status of the set of steps of the rule branch as "non already-executed". As the execution engine executes a step that is not a recycle step, it sets the status of the executed step to "already-executed" status and ignores the execution of these steps.

1 Claim, 4 Drawing Sheets

OTHER PUBLICATIONS

Jafar, A tool for interactive verification and validation of rule-based expert systems, The University of Arizona, 1989, pp. 1-136.*

Mesa International White Paper No. 6, MES Explained: A High Level Vision, XP-002260218, Sep. 1997.

Störrle, "Semantics of Structured Nodes in UML 2.0 Activities", XP-002487797, München, Germany.

Maurer, Science Direct, "Generalized Structured Programs and Loop Trees", Apr. 13, 2007, Washington D.C.

* cited by examiner

METHOD AND SYSTEM FOR CONTROLLING THE RE-EXECUTION OF A RULE BRANCH

CROSS-REFERENCE TO RELATED APPLICATION

This application claims the priority, under 35 U.S.C. §119, of European application EP 07 024 733.3, filed Dec. 20, 2007; the prior application is herewith incorporated by reference in its entirety.

BACKGROUND OF THE INVENTION

Field of the Invention

The present invention relates to a method and to a system for controlling the closing of a plant application and relates, in particular, to a method for controlling the re-execution of a rule branch in a rule represented by a graphic flowchart in a manufacturing execution system. The rule branch thereby comprises a set of steps.

Software products for industrial control and automation have increased, with time, in scope and refinement, in order to fit the large variety of IT infrastructure requirements of manufacturing companies.

As defined by the Manufacturing Enterprise Solutions Association (MESA International), a Manufacturing Execution System (MES) "is a dynamic information system that drives effective execution of manufacturing operations," by managing "production operations from point of order release into manufacturing to point of product delivery into finished goods" and by providing "mission critical information about production activities to others across the organization and supply chain via bi-directional communication."

For example, Siemens Corporation offers a broad range of MES products, under its SIMATIC® product family.

As used herein, a software application refers to a set of software components developed by software developers, at developing time, to perform some useful actions within a MES system, e.g. monitoring values coming from plant process or controlling a plant device.

Typically, at engineering time, systems engineers flexibly customize MES applications according to the specific manufacturing plant requirements. The MES application customization at engineering time is an important task in MES applications since often software developers do not have the specific knowledge of a specific plant and they thus develop a more general application.

It is then the task of the systems engineers to customize the MES application to perform specific actions according the specific requirements of a specific manufacturing plant.

At runtime, MES applications are utilized by end-users who may be plant operators or line responsible personnel and who typically utilize the MES applications without performing any programming activity.

The applications in MES system are often conceived as graphical object oriented tools.

The graphical environment allows systems engineers to build their custom functions in a graphical way using a palette of predefined elements and connecting them in order to define a logical flow of operations.

As used herein, the technical term rule refers to a portion of software comparable to a procedure or a function. It is composed by a set of instructions that are executed by an execution engine. In graphical object oriented programming, the rule is typically graphically represented by a flowchart.

The flowchart rule is typically composed by blocks interconnected by lines. The blocks represent the instructions to be executed by the execution engine and are called steps. The lines denote the flow of the activity.

As used herein, the technical term rule branch refers to a portion of a rule, a chain of steps connected together in sequence.

As used herein, the technical term loop-back or loop refers to a ring of steps connected together in sequence when the output of a step is connected to the input of a previous step in the same rule branch.

Loops are useful to graphically represent an iteration.

At engineering time, when systems engineers build MES functions in form of graphic rules, they typically expect to be able to use the common flowchart logic, for example by inserting loop-backs.

FIG. 1 is a flowchart schematically illustrating an example of an analysis scheme of a rule for error management.

It is an example of an analysis flowchart made by a systems engineer to represent the wanted behavior of rule for error management.

The flowchart rule approach shown in FIG. 1 is an example of graphical sequential programming which makes use of loop-backs.

The rule is composed by a set of interconnected steps ST, A1, A2, LOG, CK. Typically, as the skilled in the art knows, the starting and the ending of execution are symbolically denoted with a rounded shape ST, END.

At runtime, the rule steps described in FIG. 1 are sequentially executed as follows:

Step 0) execution starting ST, going to Step 1)
Step 1) executing first action A1;
Step 2) If first action A1 fails ERR, then going to Step 3);
Step 3) writing error report LOG;
go to Step 1);
Step 4) executing second action A2;
Step 5) If second action A2 fails ERR, then going to Step 3);
Step 6) execution ending END.

The execution ending of the rule is reached when both the first and the second actions A1, A2 are executed successfully OK.

Unfortunately, inserting at engineering time, one or more simple loop-back connections may lead to an out of control behavior at run time.

For example, during a serial rule execution, it is difficult to know how many times a branch, which include a sequence of steps, has been executed and it is difficult to determine what the previously executed step was. As a result unexpected infinite loops may be encountered at run time.

Encountered problems are even more complex if the runtime execution engine is able to manage the parallel execution of more than one branch of the same rule.

For example, if there is the possibility to execute a common branch more than once at the same time, this may lead to an unpredictable overwrite of the step results.

The count of each parallel execution in the call stack could easily grow exponentially.

In order to avoid problems caused by loop-backs, a wide variety of techniques exist for avoiding loop-backs.

In a first method, the execution of already executed step is avoided at run time. In this method, loop-back connections are ignored by the execution engine.

In a second method, strict controls are made at engineering time on the designed flowchart rule in order to avoid loop-backs out of the current branch or to avoid the loop-back at all. In this method, the graphic editor of the rule is complex to develop.

In a third method, with loop-backs not allowed, a rule branch is repeated by encapsulating it in a sub branch labeled as a LOOP, a step that calls a number of times a sub-branch. In this method, systems engineers need to build graphic rules by using a structured programming technique. Unfortunately, structured programming is not user friendly for systems engineers since it does not cover all the possibilities needed by user reasoning on a flowchart schema, especially for error management as in the example of FIG. 1.

FIG. 2 is a flowchart schematically illustrating an example of a rule for error management in the prior art.

The flowchart rule approach shown in FIG. 2 is an example of structured programming approach, i.e. a rule based graphical language, which makes no use of loop-backs.

Instead of using loop-backs, steps are encapsulated in sub-branches S1, S2.

The resulting graphic scheme of FIG. 2 is visually different from the scheme of FIG. 1, even if at run time the rule works as described in the flowchart of FIG. 1.

At run time, step LOOP invokes a first sub-branch S1 which begins at step LOOP in sub-branch S1 and which ends at step END LOOP.

Inside sub-branch S1, step SUB invoke a second sub-branch S2 and then continues to step LOOP.

Thus, as in rule of FIG. 1, the execution ending of the rule of FIG. 2 is reached when both first and second actions A1, A2 are executed successfully OK.

Unfortunately this kind of graphical programming approach is not user-friendly, nor immediately visible and self-documenting, for systems engineers who are required, at engineering time, to build functions according to plant requirements.

SUMMARY OF THE INVENTION

It is accordingly an object of the invention to provide a method for controlling the re-execution of a rule branch, which overcomes the above-mentioned disadvantages of the heretofore-known devices and methods of this general type and which provides for a method and a system for controlling the re-execution of a rule branch which is user friendly and reduces the risk of infinite loop-backs in the re-execution of rule branches.

With the foregoing and other objects in view there is provided, in accordance with the invention, a method and a system for controlling the re-execution of a rule branch in a rule represented by a graphic flowchart in a manufacturing execution system, the rule branch comprising a set of steps, wherein:

the flowchart is designed, at engineering time, to comprise a set of interconnected steps denoting a flow of activities to be executed, at run time, by an execution engine;

at developing time, an additional step is defined, hereinafter denoted as recycle step, wherein the recycle step comprises a conditional expression to be customized, at engineering time, and whose result, each time the recycle step is executed, at run time, is used by the execution engine to decide the rule branch to be executed;

wherein the recycle step also comprises an internal counter to keep track, at run time, of the current execution cycle; wherein, the status of the recycle step, each time it is executed at run time, is set by the execution engine as "active" status until the set of steps of the rule branch that follows is executed and then the recycle step status is set as "non-active";

wherein, at run time, the execution engine keeps waiting any request of executing a certain recycle step that is in "active" status until the certain recycle step is in a "non-active" status;

wherein, at run time, when the execution engine executes a certain recycle step, it sets the status of the set of steps of the rule branch that follows as "non already-executed" status if their status was "already executed";

wherein, at run time, the execution engine when it executes a certain step, that is not a recycle step, it sets the status of the certain executed step as "already-executed" status and it ignores the execution of steps whose status is "already-executed";

at engineering time, designing a flowchart rule comprising a set of interconnected steps containing at least one recycle step;

at run time, by the execution engine, executing the interconnected step set containing at least one recycle step of the flowchart rule.

The proposed invention allows systems engineers, at engineering time, to use a simple and easy to use flowchart approach for building rules in a MES system while at the same time controlling that the re-execution of rule branches does not lead to infinite loops.

With the proposed invention, the rule looks similar to an analysis scheme.

It is not necessary to change the execution engine of the rule at run time because the execution of the loop-back is managed by the recycle-step. Thus, advantageously, old applications may continue to work as before. Embodiments of the proposed invention simplify the implementation of nested iterations such as:

While <Condition> Do <Actions>

Repeat <Actions> Until <Condition>

For Index=1 to X Do <Actions>.

Embodiments of the proposed invention allow the re-using of a shared branch, i.e. when the outputs of two steps are connected to the same rule branch, by queuing subsequent executions.

Other features which are considered as characteristic for the invention are set forth in the appended claims.

Although the invention is illustrated and described herein as embodied in the controlling the re-execution of a rule branch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 3:
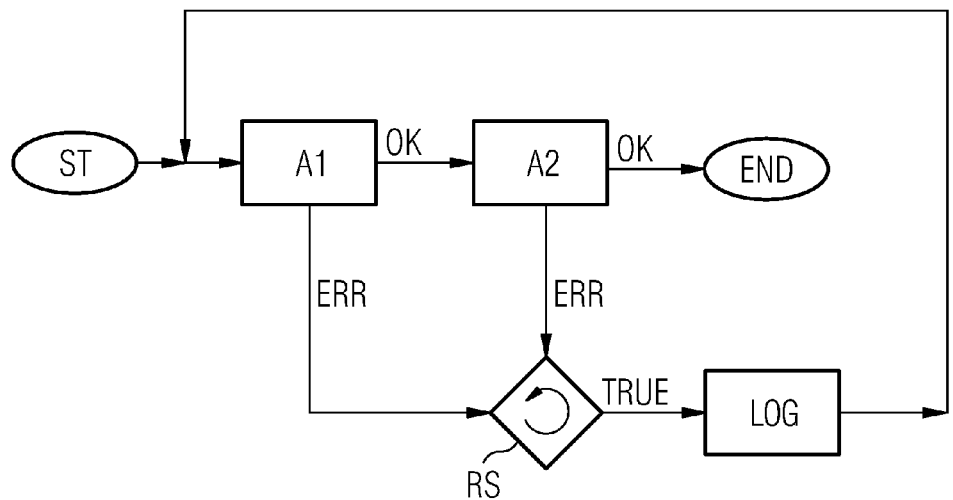
FIG. 3 is a flowchart which schematically illustrates an example of a rule for error management according to a first embodiment of the present invention.
Figure 4:
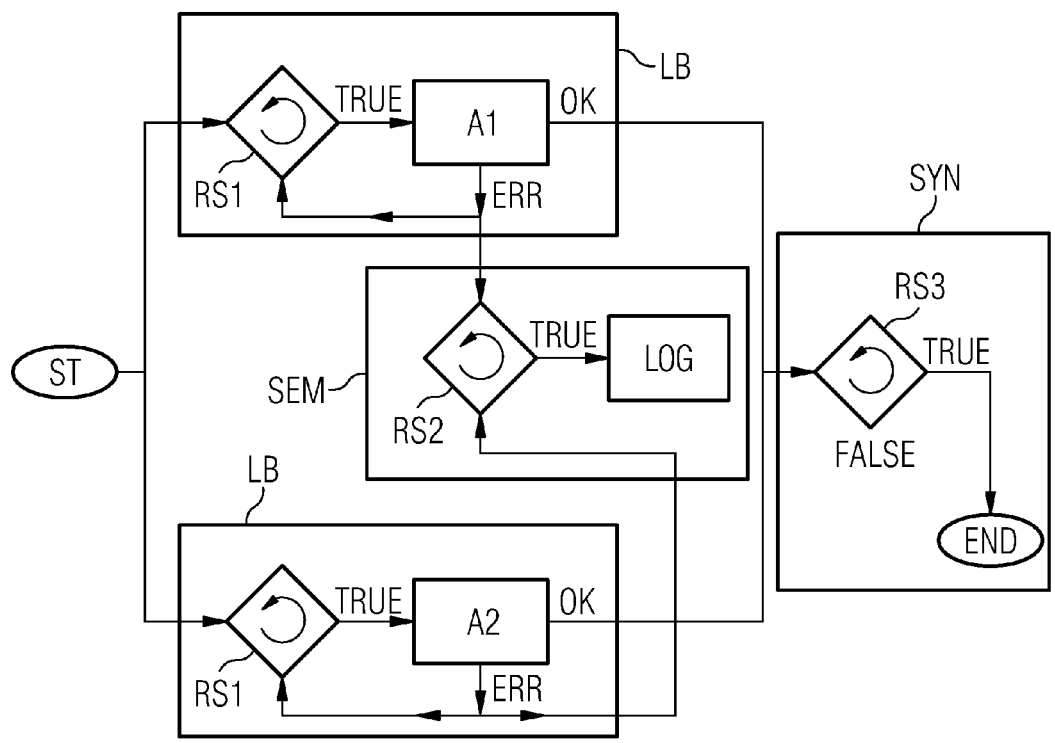
FIG. 4 is a flowchart which schematically illustrates an example of a rule for error management with parallel execution according to a second embodiment of the present invention.

In the drawings, FIGS. 3 to 5, the recycle steps RS, RS3, RS5 used for managing the re-execution of rule branch according to the present invention, are graphically represented with a diamond/rhombus with a cyclic arrow inside.

The diamond/rhombus indicates that the recycle step RS contains a custom conditional expression, returning a value TRUE or FALSE, to be evaluated at run time, each time the step is executed. The result of this TRUE/FALSE test is used by the execution engine, at run time, to determine the rule execution path that follows.

The TRUE/FALSE test condition is customized, at engineering time, by the systems engineer when he/she, while defining a specific rule, inserts at least one recycle step RS which may be connected to other steps of the rule.

The recycle step RS contains an internal counter so that, at run time, the current execution cycle can be tracked.

The reset of the counter is performed only at the rule start. When a rule starts, the counter of every recycle step in the rule is set to zero. Then, the counter of a recycle step is incremented every time the recycle step is executed by the rule engine, until the end of the entire rule execution.

This internal counter advantageously allows the recycle step RS to easily implement a "For" nested iteration, such as, e.g. "For Index=1 to X Do <Actions>."

This feature of the recycle step RS advantageously enables a systems engineer to easily program the maximum number of trials in case of error.

At run time, each time the recycle-step RS is activated, it resets runtime data of the steps that follow in order to avoid confusion in subsequent executions of the same rule.

In fact, at run time, the execution engine, when executing a certain step that is not a recycle step RS, it sets the status of this certain executed step as "already-executed" status and it ignores the execution of steps whose status is "already-executed."

However, according to the proposed invention, in order to conveniently allow the re-execution of a rule-branch, the execution engine, each time it executes a certain recycle step, it sets the status of steps of the rule branch that follows this certain recycle step RS as "non already-executed" (or: not yet executed) status so that the rule branch can be re-executed.

When a certain recycle step RS is executed, the execution engine starts the execution of the next steps, and the certain recycle step RS remains active until all of the steps that follow have been executed. The rule execution engine is recursive so the control returns to the recycle step when the subsequent rule branch execution has been finished.

Because of this, at run time, in case of parallel invocations, the recycle step may act as a semaphore to avoid the parallel execution of the branch that follows.

If another branch of the same rule, requests to activate this certain recycle-step RS while this certain recycle-step RS is already/still active, the new request is put on wait until the end of the branch execution is reached, and only then the new request is executed.

FIG. 3 is a flowchart which schematically illustrates an example of a rule for error management according to a first embodiment of the present invention. The flowchart rule of FIG. 3 is an example of sequential execution with programming with a recycle step RS according to an embodiment of the present invention.

Figure 1:
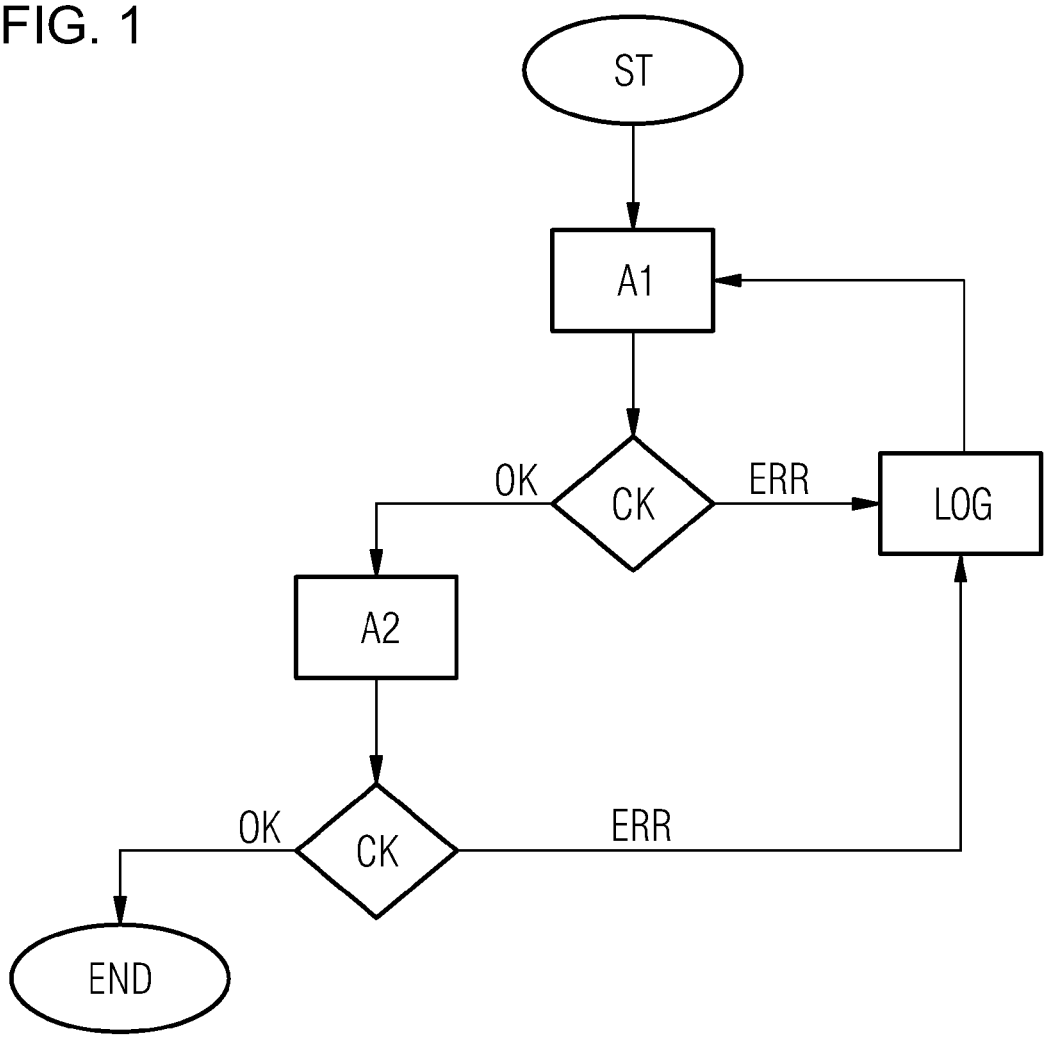
FIG. 1 is flowchart which schematically illustrates an example of an analysis schema of a rule for error management.
Figure 2:
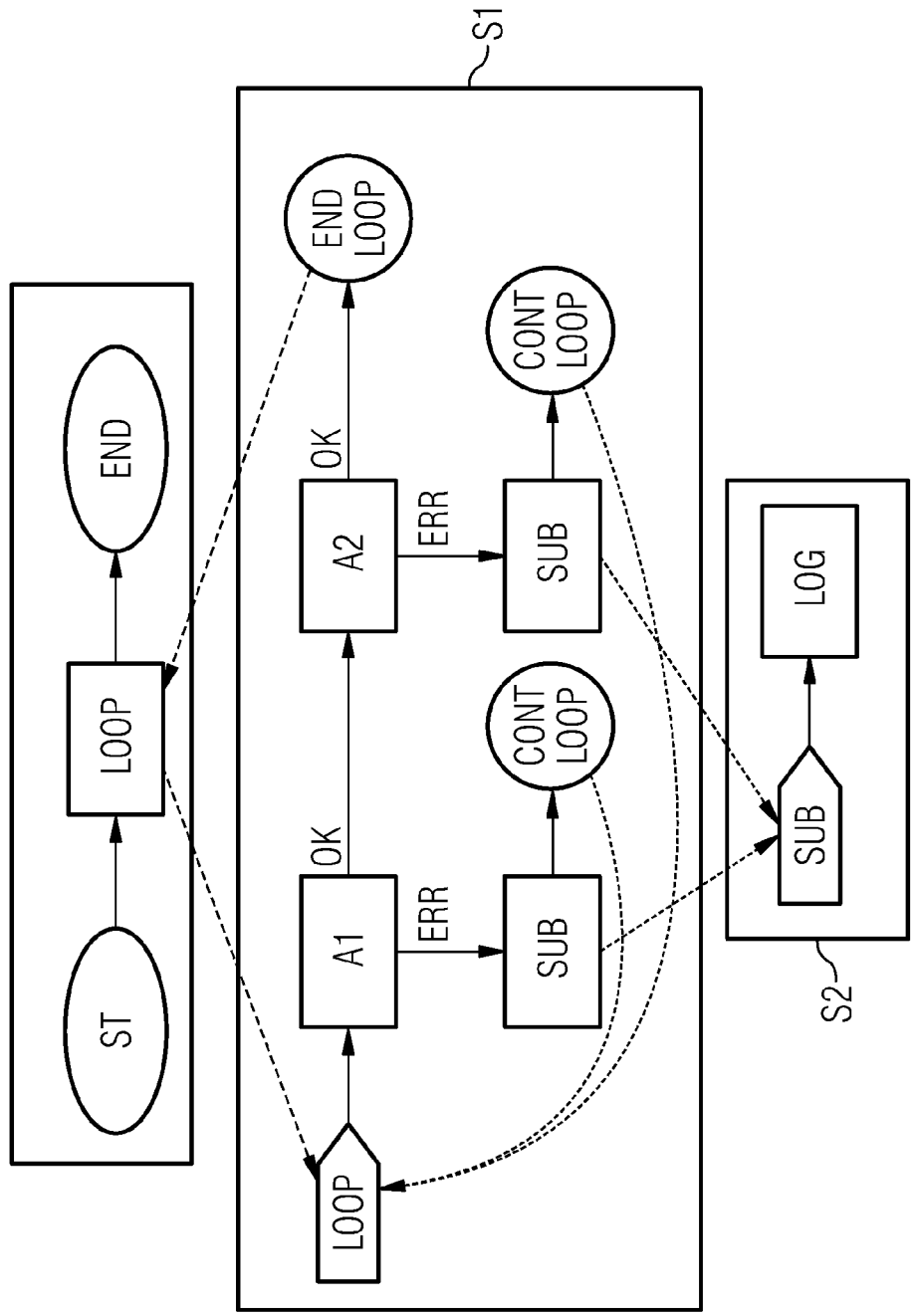
FIG. 2 is a flowchart which schematically illustrates another example of a rule for error management according to the prior art.

The implementation of the rule steps of FIG. 3 is very similar to the analysis scheme represented in FIG. 1, using a rule based graphical language as in FIG. 2.

The flowchart scheme of FIG. 3, in that it resembles the analysis scheme of FIG. 1, has the advantages of being simple to understand and of being self-documenting and easily visible to systems engineers.

At runtime, the rule steps described in FIG. 3 are executed as follows:

Step 0) execution starting ST, going to Step 1)
Step 1) executing first action A1;
Step 2) If first action A1 fails ERR, then going to Step 3);
Step 3) writing error report LOG;
go to Step 1);
Step 4) executing second action A2;
Step 5) If second action A2 fails ERR, then going to Step 3);
Step 6) execution ending END At steps 2 and 5, the checks of failure of the two actions A1, A2 is performed by the recycle step RS. At engineering time, the custom conditional expression of the recycle step RS is customized so that, at run time, if input is ERR the recycle step result is TRUE.

At step 3, the execution engine, after having executed the writing error report step LOG, sets the status of this step to "already-executed" status. While, at the start step ST of the rule the status of the log-report step LOG was "not yet executed."

The execution engine is programmed to ignore the execution of steps A1, A2, LOG—that are not recycle steps RS—whose status is "already-executed."

However, each time the recycle step RS is executed the status of the log-report step LOG (which is in the branch that follows) is reset to "not yet executed" status. In this way, a re-execution of the same rule branch is enabled.

The execution ending of the rule is reached when both first and second actions A1, A2 are executed successfully OK.

FIG. 4 is a flowchart which schematically illustrates an example of a rule for error management with parallel execution according to a second embodiment of the present invention.

The flowchart rule of FIG. 4 is an example of three different possible use-cases of the recycle steps RS1, RS2, RS3 inside a flowchart rule.

According to the first use-case, FIG. 4 shows two parallel loops-back on error LB for error management via the recycle steps RS1.

According to the second use-case, FIG. 4 shows a recycle-step RS2 used to serialize the parallel usage of the common log-report step LOG, for obtaining a semaphore SEM on shared resources.

The "semaphore" property is achieved by setting the status of the recycle step RS2, each time it is executed at run time, as "active" status until the set of steps of the rule branch that follows, e.g. log-report step LOG, is executed and then the recycle step status is set as "non-active."

At run time, the execution engine keeps waiting for any request to execute the recycle step RS2 if is in "active" status until its status is in "non-active."

According to the third use-case, FIG. 4 shows a recycle-step RS3 that counts two (2) cycles before terminating the rule.

At engineering time, the systems engineers customize the conditional expression of the recycle step RS3 to return TRUE when its internal counter reaches the value 2.

In this third use-case block SYN acts as synchronization point: the end step END is called on the second OK when cycle number equals 2. In this way, as in the previous examples of FIGS. 1 to 3, the execution ending of the rule is reached when both first and second actions A1, A2 are executed successfully OK.

Figure 5A:
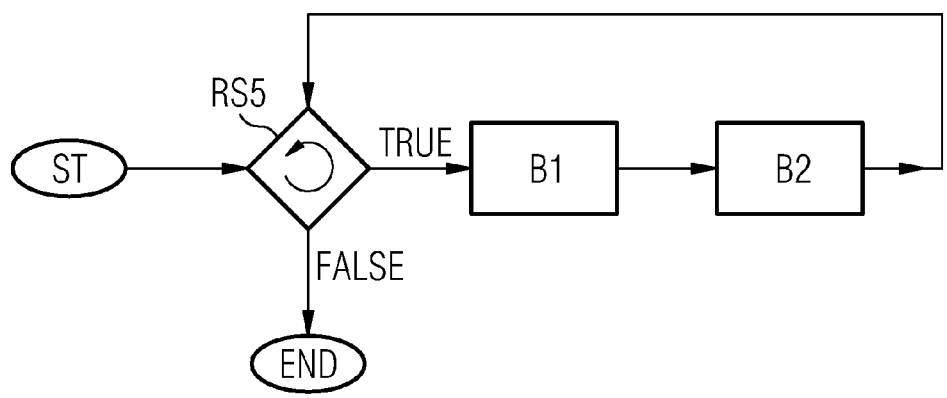
FIGS. 5A and 5B are flowcharts which schematically illustrate examples of rules for common iterations according to embodiments of the present invention.
Figure 5B:
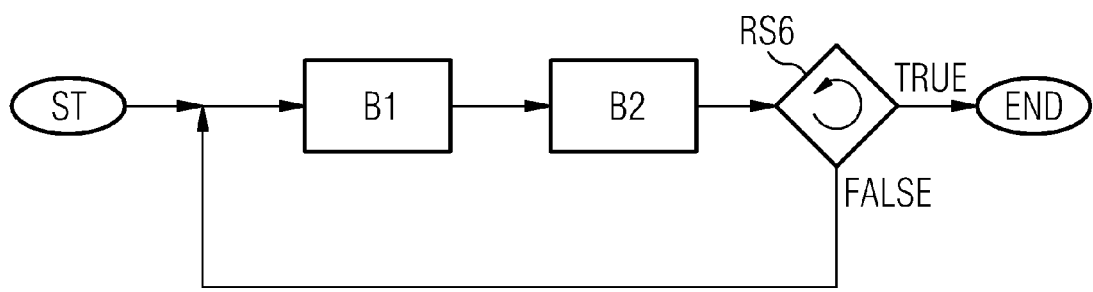

FIG. 5 (FIGS. 5A and 5B) are flowcharts schematically illustrating examples of rules for common iterations according to embodiments of the present invention.

The flowchart rule of FIG. 5 is an example of three different possible use-cases of the recycle steps RS5, RS6 for implementing the most common iterations. FIG. 5A is an example of "while" or "for" iteration and FIG. 5B is an example of "repeat until" iteration.

The recycle step RS5, RS6 acts as a "While" or "For" iteration depending on its location when used before a rule branch (see FIG. 5A) or as a "Repeat Until" iteration if used after a rule branch (see FIG. 5B). The rule engine executes the rule steps in sequence starting from the starting step ST, so if the recycle step RS5 is positioned at the input, i.e. before, of a rule branch it is executed before of the steps in rule branch B1, B2 (See FIG. 5A); instead, if the recycle step is positioned at the output, i.e. after, of a rule branch it will be executed after that the steps in the rule branch (B1, B2) have been executed (See FIG. 5B).

In FIG. 5A, at run time, the two action steps B1, B2 may be executed in a nested iteration of the type While <Condition> Do <Actions>. In this case, the condition to be fulfilled is customized, at engineering time, by the systems engineer.

Alternatively, still in FIG. 5A, at run time, the two action steps B1, B2 may be executed in a nested iteration of the type For Index=1 to X Do <Actions>. In this case, the internal counter limit index is customized, at engineering time, by the systems engineer.

In FIG. 5B, at run time, the two action steps B1, B2 are executed in a nested iteration of the type Repeat <Actions> Until <Condition>. In this case, the condition to be fulfilled is customized, at engineering time, by the systems engineer.

Advantageously, the recycle step RS5, RS6, which implements different iteration according to its location in a loopback, make easier the implementation of nested iterations in algorithms at engineering time.

For example, the systems engineers can easily drag and drop, in a graphical way, a recycle step RS in a flowchart rule to switch from a "while" iteration to a "repeat" iteration.

While example of structured programming approach of FIG. 2 of the prior art, such a switch would have involved programming efforts at engineering time.

The systems engineers, with embodiments of the proposed invention, are not required to change the existing rules according to the prior art that will continue to work exactly as before.

However, the recycle step can simplify the existing rules, by rendering the rule more user friendly and by reducing the number of steps in the rule and consequently reducing the allocated memory.

The invention claimed is:

1. A method of controlling a re-execution of a rule branch in a rule represented by a graphical flowchart in a manufacturing execution system, the rule branch including a set of steps, and the method which comprises:

at engineering time, designing the flowchart to comprise a set of interconnected steps denoting a flow of activities to be executed, at run time, by an execution engine;

at developing time, defining an additional step in the form of a recycle step, the recycle step including a conditional expression to be customized, at engineering time, and having a result, each time the recycle step is executed at run time, to be used by the execution engine to decide the rule branch;

the recycle step further including an internal counter keeping track, at run time, of a current execution cycle;

each time the recycle step is executed at run time, setting a status of the recycle step to "active" status with the execution engine until a set of steps of the rule branch that follows is executed, and then setting the status of the recycle step "non-active;"

at run time, waiting with the execution engine with any request to execute a given recycle step that is in "active" status until the given recycle step is in a "non-active" status;

at run time, when the execution engine executes a given recycle step, setting a status of the set of steps of the rule branch that follows to "not yet executed" status if a status thereof was "already executed;"

at run time, when the execution engine executes a given step that is not a recycle step, setting the status of the given executed step to "already-executed" status and ignoring the execution of steps whose status is "already-executed;"

at engineering time, designing a flowchart rule comprising a set of interconnected steps containing at least one recycle step; and at run time, executing with the execution engine the interconnected step set containing the at least one recycle step of the flowchart rule.

* * * * *